Patented Oct. 13, 1936

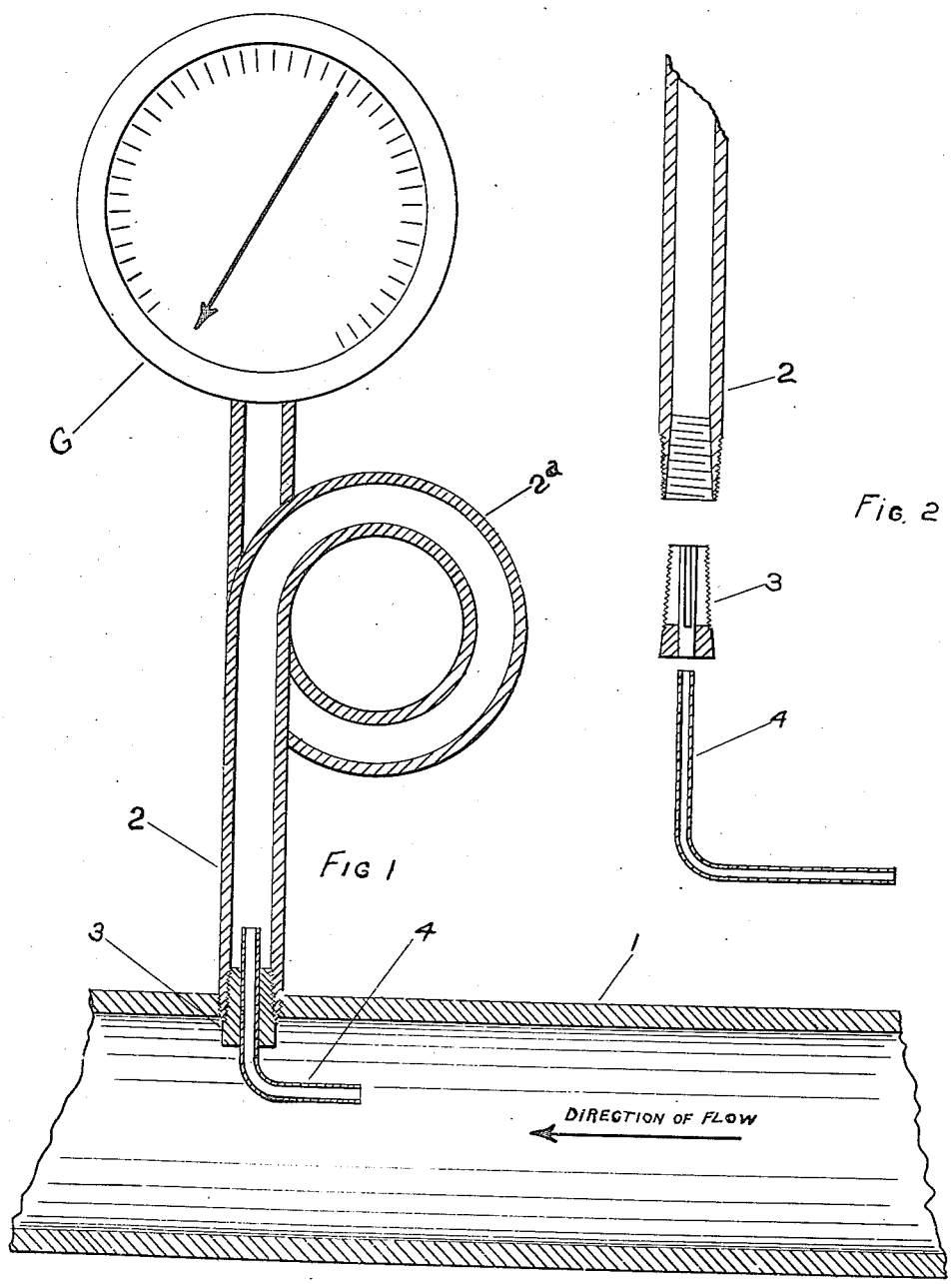

2,057,645

UNITED STATES PATENT OFFICE 2,057,645

PRESSURE GAUGE

Erwin H. Hamilton, Hastings-on-Hudson, N. Y.

Application January 8, 1934, Serial No. 705,653

7 Claims. (Cl. 73—212)

My invention relates to pressure gauges and more particularly to ways and means to cause the dial of such a gauge to indicate directly the total pressure in a conduit or the like.

Heretofore, in order to know the total pressure head in a pipe line or other conduit, the static pressure has been read upon the ordinary pressure gauge attached to the conduit; then to this reading is added an additional pressure usually found by determining the velocity of the material flowing in the conduit and computing the pressure equivalent of the velocity head of the material. This method is cumbersome, awkward, and requires time and attention and introduces a likely source of error.

It is one object of my invention to eliminate the necessity for computation of the pressure equivalent of the velocity head.

It is another object of my invention to provide means that will add directly onto the indicating needle of the pressure gauge the pressure equivalent of the velocity head of the material flowing in the conduit so that the needle of the pressure gauge indicates directly the total pressure in the conduit.

It is a further object of my invention to provide connecting means for a standard type pressure gauge whereby the needle of the gauge is affected both by the static pressure and the pressure equivalent of the average velocity head of material in a conduit.

It is a further object of my invention to provide connections for a pressure gauge that will indicate the total pressure in a conduit regardless of the direction of flow of material therein.

Other and further objects of my invention will be apparent from the following specification taken in conjunction with the accompanying drawing wherein—

Figure 1 is a side elevation partly in vertical section and partly diagrammatic of the pressure gauge and connections of my invention; and Fig. 2 is an exploded view of a portion of the connecting elements for a pressure gauge, the parts being shown in vertical section.

1 indicates a portion of a pipe line or conduit, the total pressure in which is to be measured. A pressure gauge G is connected to the conduit 1 through a connection pipe 2 that is provided with a loop 2a. This connection pipe 2 is one of several forms of connection pipes commonly used between a conduit and a pressure gauge. These connection pipes are known by several different names in this art, and any of the various shapes may be substituted for the one shown here. When the gauge is connected to a steam main, the loop 2a or equivalent arrangement is used to accumulate a charge of water which acts as a seal to prevent steam reaching the gauge.

Actual sealing is not indicated in the present drawing. Also, the gauge is indicated diagrammatically because no special form of gauge is required with my invention. I have used a standard Bourdon type of gauge.

With the connections as thus far described, the pressure gauge G will indicate the static pressure in the conduit 1. In order to have the gauge G register the total pressure, it is necessary that the needle and dial also show the pressure equivalent to the velocity head of the material flowing in the conduit 1. This may be done by providing an L-shaped contact tube 4, one leg of which is inserted in the connection pipe 2, and the other leg of which extends parallel to the axis of the pipe or conduit 1. The contact tube 4 is held in place by means of a clamping nut 3 which is externally screw threaded to engage the internal screw threads of the pipe connection 2. The clamping nut 3 may be of any of the conventional types, a split clamping nut being shown in the drawing. The leg of the contact tube 4 passes through the central bore thereof. It will be noted that the clamping nut 3 closes the pipe connection except for the opening for the contact tube 4.

This adjustable clamping arrangement has been chosen by me so that the contact or impact tube 4 may be adjusted to various positions. The first adjustment desired is to have the open mouth of the leg of the tube 4 that is co-extensive with the axis of the conduit 1 point in the opposite direction to the direction of flow of material in the conduit 1.

This relationship is indicated in Fig. 1 by the arrow indicating the direction of flow and the location of the open mouth of the contact tube 4. The second adjustment desired is to have the leg of the tube 4 that is co-extensive with the axis of the conduit 1 extend into the conduit far enough to be subject to the average velocity of the material flowing in the conduit.

As is well known, the average velocity will be affected by conditions in the conduit in the vicinity of the point of connection of the gauge such as elbows, pipe constrictions, expanded areas, etc. The average velocity may be determined in any one of a number of known methods, or by taking velocity readings at various points and averaging the same. Then the location of the contact tube is adjusted until a like reading is obtained. Once the tube is adjusted to the proper position, it will continue to function thereafter to indicate the pressure equivalent of the average velocity.

It will be readily understood that the gauge G is subject to the static pressure in the conduit 1 through the open tube 4 and by the arrangement and adjustment of this tube 4 as indicated above, the needle of the pressure gauge G will also be moved in accordance with the pressure equivalent of the velocity of the material flowing in the conduit, which will be added to the static pressure indication. The foregoing arrangements are exceedingly simple and they have been proven to be very effective and accurate in practice.

Modifications may be made in the arrangement and location of parts within the spirit and scope of my invention, and such modifications are intended to be covered by the appended claims.

I claim:

1. A totalizing pressure gauge comprising an indicating device, a pipe connection to the indicating device, the free end thereof being adapted to communicate with a continuous closed conduit the pressure in which is to be measured, a contact tube mounted in the wall of said conduit and communicating with said pipe connection, and means for adjustably mounting the contact tube in place in said conduit so that the position of the open end thereof may be oriented to face opposed to the direction of flow in said conduit.

2. A totalizing pressure gauge comprising an indicating device, a pipe connection to the indicating device, the free end thereof being adapted to communicate with the continuous closed conduit the pressure in which it is to be measured, a contact tube mounted in the wall of said conduit and communicating with said pipe connection, and means for adjustably mounting the contact tube in place in said conduit so that the open end thereof is positioned to face opposed to the direction of flow in said conduit, said tube also being adjustable to be subject to the mean velocity of the material flowing in said conduit.

3. A totalizing pressure gauge comprising an indicating device, a pipe connection to the indicating device, the free end thereof being adapted to communicate with the closed conduit the pressure in which is to be measured, an L-shaped contact tube mounted in the wall of said conduit and communicating with said pipe connection, and means for adjustably mounting said contact tube in the wall of said conduit so that one leg thereof may be pointed in various directions and also so that the whole tube may be adjusted to various places with respect to the axis of the conduit.

4. A totalizing pressure gauge comprising an indicating device, a pipe connection to the indicating device, the free end thereof being adapted to communicate with the closed conduit the pressure in which is to be measured, an L-shaped contact tube mounted in said conduit and said pipe connection and having the opening thereof facing in the direction opposite to the direction of flow in the conduit, and clamping means for adjustably varying the position of said contact tube in said pipe connection, the pipe connection being closed to the conduit except through said contact tube.

5. A totalizing pressure gauge for measuring the total pressure in a continuous closed conduit in which the static pressure is greater than atmospheric, comprising a pressure responsive indicating device, a pipe connection mounted in the wall of said conduit and communicating with the indicating device, an L-shaped contact tube having one end in said pipe connection and the other end in said conduit, means for adjustably securing said contact tube in said pipe connection so that the contact tube may be adjusted radially of the conduit.

6. A totalizing pressure gauge for measuring the total pressure in a continuous closed conduit in which the static pressure is greater than atmospheric, comprising a pressure responsive indicating device, a pipe connection mounted in the wall of said conduit and communicating with the indicating device, an L-shaped contact tube having one end in said pipe connection and the other end in said conduit, means for adjustably securing said contact tube in said pipe connection so that the contact tube may be adjusted radially of the conduit and so that the contact tube may be turned to point said other end in various directions in the conduit.

7. A totalizing pressure gauge for measuring the total pressure in a conduit comprising a pressure responsive indicating device, a pipe connection mounted in a wall of said conduit and communicating with said indicating device, an L-shaped contact tube having one end in said pipe connection and the other end in said conduit, a split nut adjustably securing said contact tube in said pipe connection so that the contact tube may be adjusted radially of the conduit and so that the contact tube may be turned to point said other end in various directions in the conduit.

ERWIN H. HAMILTON.